(12) United States Patent
Roeland et al.

(10) Patent No.: US 9,661,680 B2
(45) Date of Patent: May 23, 2017

(54) METHODS AND DEVICES FOR EFFICIENT CONNECTION HANDLING FOR AVOIDING A DETACHED STATE

(71) Applicant: TELEFONAKTIEBOLAGET L M ERICSSON (PUBL), Stockholm (SE)

(72) Inventors: Dinand Roeland, Sollentuna (SE);
Peter Hedman, Helsingborg (SE);
Stefan Rommer, Vastra Frolunda (SE);
Ivo Sedlacek, Praha (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 591 days.

(21) Appl. No.: 14/153,734

(22) Filed: Jan. 13, 2014

(65) Prior Publication Data

US 2015/0201453 A1   Jul. 16, 2015

(51) Int. Cl.
H04W 76/04   (2009.01)
H04W 76/02   (2009.01)
H04W 36/14   (2009.01)

(52) U.S. Cl.
CPC ....... *H04W 76/045* (2013.01); *H04W 76/021* (2013.01); *H04W 76/026* (2013.01); *H04W 36/14* (2013.01)

(58) Field of Classification Search
CPC ............. H04W 76/026; H04W 76/045; H04W 76/021; H04W 36/14
See application file for complete search history.

(56) References Cited

U.S. PATENT DOCUMENTS

| 9,220,118 B1* | 12/2015 | Ramamurthy | ........ H04W 76/02 |
| 2006/0282889 A1* | 12/2006 | Brown | ................ H04L 63/0272 726/15 |
| 2010/0135229 A1* | 6/2010 | Lohr | ................ H04W 72/1284 370/329 |
| 2012/0224476 A1* | 9/2012 | Jin | ........................ H04L 5/0091 370/229 |

OTHER PUBLICATIONS

3GPP TS 23.401, V12.2.0 (Sep. 2013), Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 293 pages.

(Continued)

*Primary Examiner* — Gbemileke J Onamuti
(74) *Attorney, Agent, or Firm* — Rothwell, Figg, Ernst & Manbeck, P.C.

(57) ABSTRACT

A method, implemented by a network node, for establishing an efficient dummy network connection between a mobile device and a first network includes establishing at least one data connection between the mobile device and the first network. The method further includes receiving a request to establish the efficient dummy network connection. The method also includes establishing the efficient dummy network connection after receiving the request, where the efficient dummy network connection that is established uses a minimum number of network resources, said minimum number of network resources being less than the number of network resources used in the at least one data connection.

26 Claims, 12 Drawing Sheets

(56) References Cited

OTHER PUBLICATIONS

3GPP TS 23.402, V12.2.0 (Sep. 2013), Technical Specification, 3rd Generation Partnership Project; Technical Specification Group Services and System Aspects; Architecture enhancements for non-3GPP accesses (Release 12), 256 pages.

3GPP TS 24.301, V12.2.0 (Sep. 2013), Technical Specification, "3rd Generation Partnership Project; Technical Specification Group Core Network and Terminals; Non-Access-Stratum (NAS) protocol for Evolved Packet System (EPS); Stage 3 (Release 12)", 352 pages.

Harri Holma and Antti Toskala, "LTE for UMTS OFDMA and SC-FDMA Based Radio Access," Wiley, ISBN 978-0-470-99401-6, XP-002739093, Aug. 2009, 4 pages.

Catt, "Minor modification to solution 2," SA WG2 Meeting S2 #98, S2-1232906 (revision of S2-132521), Jul. 15-19, 2013, 2 pages.

Ericsson et al., "Traffic Steering for RAN-based WLAN interworking solution," SA WG2 Meeting #103, S2-142158 (revision of S2-141960), May 19-23, 2014, 24 pages.

International Search Report and Written Opinion issued in corresponding application No. PCT/SE2014/051497, dated May 11, 2015, 8 pages.

\* cited by examiner

METHODS AND DEVICES FOR EFFICIENT CONNECTION HANDLING FOR AVOIDING A DETACHED STATE

TECHNICAL FIELD

This disclosure relates generally to devices and methods for efficient connection handling for avoiding a detached state and, more particularly, to methods and devices for establishing an efficient dummy PDN connection for avoiding a detached state.

BACKGROUND

A concept in 3GPP Evolved Packet Core (EPC) architecture is a "Packet Data Network" (PDN). A PDN is an IP network, which is typically, for example, the Internet, but it can also be a closed corporate network or an operator service network, like IMS. A PDN has one or more names, each name represented in a string called an Access Point Name (APN). A PDN gateway (PDN-GW or PGW) is a functional node that provides access to one or more PDNs.

As illustrated in FIG. 1, a PDN connection provides a User Equipment (UE) with an access channel to a PDN. The PDN connection is a logical IP tunnel between the UE and PGW. Each PDN connection has a single IP address/prefix. A UE can setup multiple PDN connections, possibly to the same APN. Each PDN connection contains one or more EPS Bearers, where each bearer is defined by a set of IP packet filters and a QoS profile. Each EPS bearer runs end-to-end between UE and PDN GW and is a concatenation of an S5 GTP tunnel (PGW-SGW), an S1 GTP tunnel (SGW-eNB), and a radio bearer (eNB-UE).

FIG. 1 further illustrates an EPC network with LTE as radio access network. This type of access is also called a "3GPP access" because the radio access technology is defined by 3GPP. A non-3GPP access is a radio access network based on a radio technology not defined by 3GPP (e.g., CDMA200 or WLAN). A PDN connection can be setup over a 3GPP access or over a non-3GPP access. FIG. 2 illustrates these concepts. Integration of WLAN as non-3GPP access with the 3GPP Evolved Packet Core (EPC) is specified in 3GPP TS 23.402 section 16. The entire contents of the specification 3GPP TS 23 is incorporated herein by reference.

The UE may connect to the mobile core network and the PDN via a non-3GPP access. If such non-3GPP access is a WLAN, then the UE needs to select a WLAN access point (AP). Also, if the UE is connected to both the 3GPP access and the WLAN access, a method is needed to decide which part of the user-plane traffic to route over which access.

Conventionally, two basic methods are available. In a first method, AP selection and traffic steering is controlled by operator policies received in the UE from the Access Network Discovery and Selection Function (ANDSF). ANDSF is defined and described in 3GPP TS 23.402 section 4.8. ANDSF is a core network function that is accesses by the UE over an IP-based interface (S14). In a second method, AP selection and traffic steering is controlled from the 3GPP radio access network (RAN). A 3GPP study on this method is currently ongoing (see 3GPP TR 37.834). Several different solution variants are defined in this study, and the final outcome may even be a combination of these variants. What these solutions have in common is that control signaling for AP selection and traffic steering is sent from the radio controller (eNB or RNC) in the RAN.

A basic design principle in LTE is that a UE connected to an EPC via LTE always has an IP connection (i.e., a UE always has at least one PDN connection). If the last PDN connection gets disconnected from a LTE network (e.g., because of a handover from LTE to WLAN), then the UE gets disconnected from the LTE network. Upon a handover of a PDN connection to a WLAN, if the PDN connection is routed to an EPC via WLAN, the UE continues using the PGW in the EPC, but if the last PDN connection was handed over from the LTE network to the WLAN, the UE is disconnected from the LTE network.

In RAN-based network selection and traffic steering, the control signaling goes over the LTE network. If the UE gets disconnected from the LTE (e.g., because RAN steers all traffic for that UE to the WLAN, and all EPS bearers and consequently all PDN connections are moved to WLAN), then subsequent control signaling cannot reach the UE anymore. This is a problem in RAN-based traffic steering.

One solution to this problem is to ensure that there always stays at least one PDN connection over the LTE network (e.g., the PDN connection for IMS voice always stays on the LTE network, while the PDN connection for Internet data traffic can move between the LTE network and WLAN). However, this solution may not always be possible. A common solution may be that the UE only has a single PDN connection carrying all types of traffic. In order to stay connected to the LTE network, even in the case the single PDN Connection is moved to the WLAN, a solution could be to setup a "dummy PDN connection" to the LTE network. Several alternatives exist on when to setup the dummy PDN connection. This could, for example, be done when the UE first connects to LTE, where the dummy PDN connection is never released, or when the UE sets up the dummy PDN connection just before the ordinary PDN connection is handed over to the WLAN. The dummy PDN Connection can then be released when the ordinary PDN connection has returned to the LTE network.

Having a dummy connection is not preferred, for a number of reasons. First, the dummy connection generates control signaling upon initial setup and upon intra-LTE handover. Second, the dummy connection takes resources in the involved network nodes (e.g., memory state). While EPC and LTE has a built-in requirement to have at least one PDN connection in the LTE network, if the UE does not need any PDN connection in the LTE network and still needs to be connected to the LTE network, the needed network resources should be as little as possible.

When the UE has no PDN connection via the LTE network, the UE is detached from the LTE network (and EPC via LTE), which is built into the EPC design (the term LTE can also be replaced with E-UTRAN). However, in some situations it is desirable to consume as little resources as possible (e.g., reduce the resources needed in radio network, S-GW or P-GW, and still be connected to the LTE network). An example of this situation includes when RAN (i.e., eNB) controls UE usage of the WLAN and decides to move all PDN connections of the UE to the WLAN. In this case, no PDN connection is kept via LTE, but RAN should still continue being able to manage the UE. Another example includes when the UE uses machine-to-machine communication and normally communicates with its application server only rarely (e.g., for a few minutes every day at regular time slot), but wants to enable the application server to start communication at any time. In this situation, the UE needs to be connected to the PGW for the particular time slot only, and for the remaining time, it can be reachable just for SMSs. Another example includes when the UE is data centric and the UE only wants to receive emergency alerts (e.g., ETWS messages or PWS messages).

SUMMARY

According to some embodiments, a method, implemented by a network node, for establishing an efficient dummy network connection between a mobile device and a first network includes establishing at least one data connection between the mobile device and the first network. The method further includes receiving a request to establish the efficient dummy network connection. The method also includes establishing the efficient dummy network connection after receiving the request, where the efficient dummy network connection that is established uses a minimum number of network resources, said minimum number of network resources being less than the number of network resources used in the at least one data connection.

According to some embodiments, a network node for establishing an efficient dummy network connection between a mobile device and a first network includes a processor, and a memory coupled to the processor. The processor is configured to establish at least one data connection between the mobile device and the first network. The processor is further configured to receive a request to establish the efficient dummy network connection. The processor is also configured to establish the efficient dummy network connection after reception of the request, where the efficient dummy network connection that is established uses a minimum number of network resources, said minimum number of network resources being less than the number of network resources used in the at least one data connection.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

According to some embodiments, an efficient dummy PDN connection is established when the last PDN connection is not needed in the LTE network and the UE still needs to stay connected to the LTE network. In this regard, the PDN connection is kept but most of its network resources are released. For example, resources in the PGW and SGW are released, and resources needed in the radio network to enable connected mode mobility are set to a bare minimum. Additionally, in some embodiments, parameters are set to prevent the UE from transmitting upstream packets over the efficient dummy PDN connection. A PDN connection may be moved, for example, from the LTE network to the WLAN network when the LTE network is overloaded and there is free capacity in the WLAN network, or when the LTE signal strength gets low, and the WLAN signal strength is high.

Figure 1:
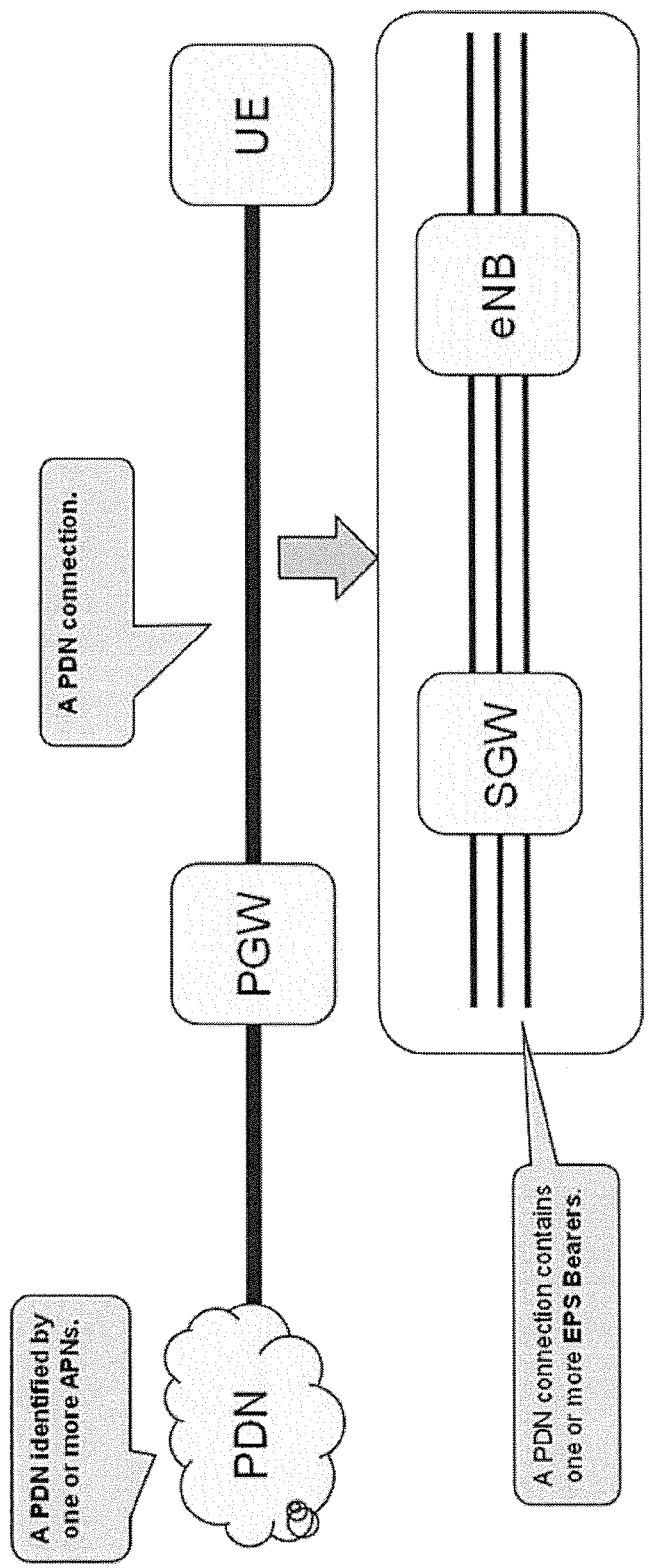
FIG. 1 is an illustration of a PDN connection and EPS bearer.
Figure 2:
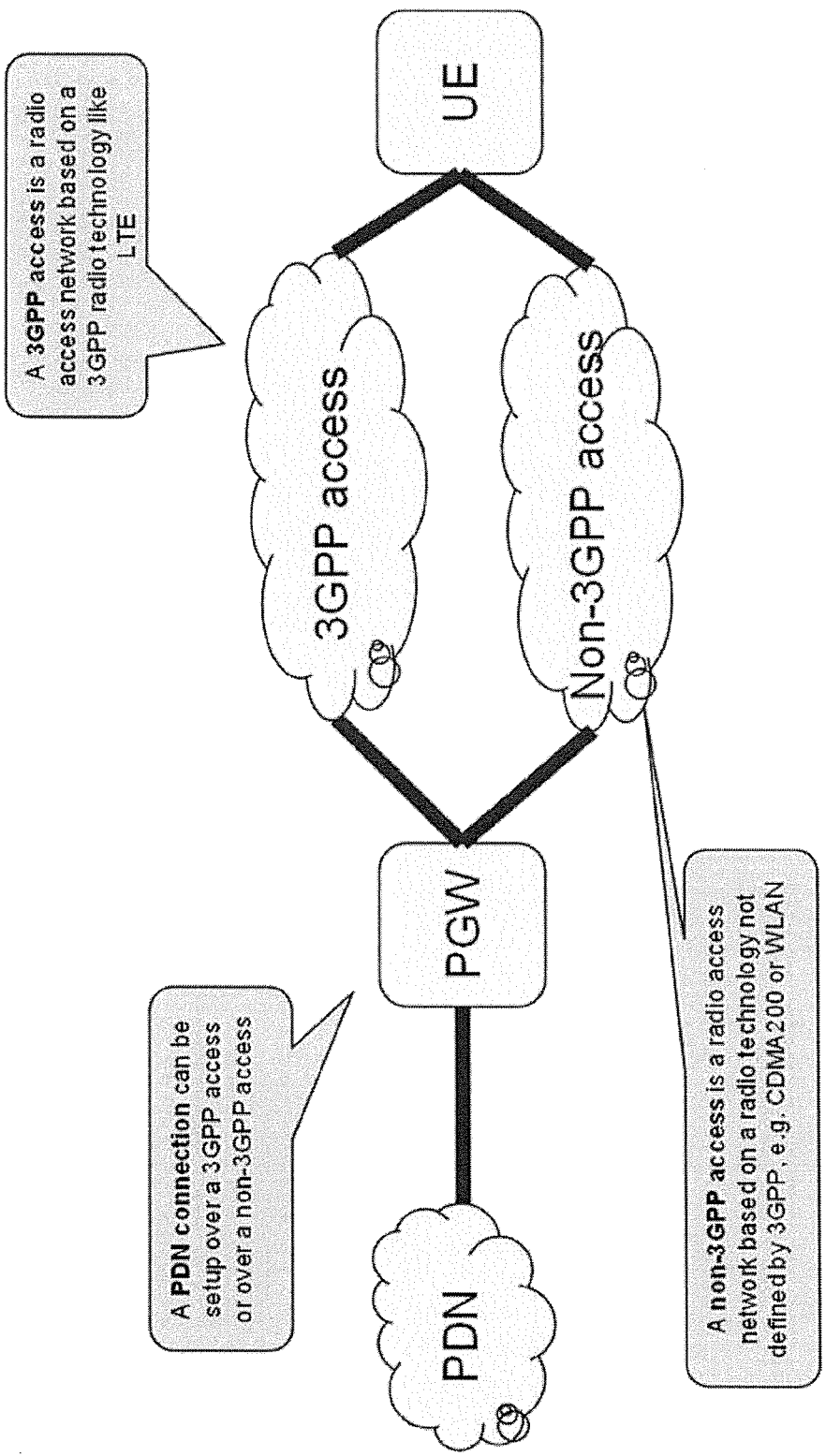
FIG. 2 is an illustration of a network topology with 3GPP access and non-3GPP access.
Figure 3:
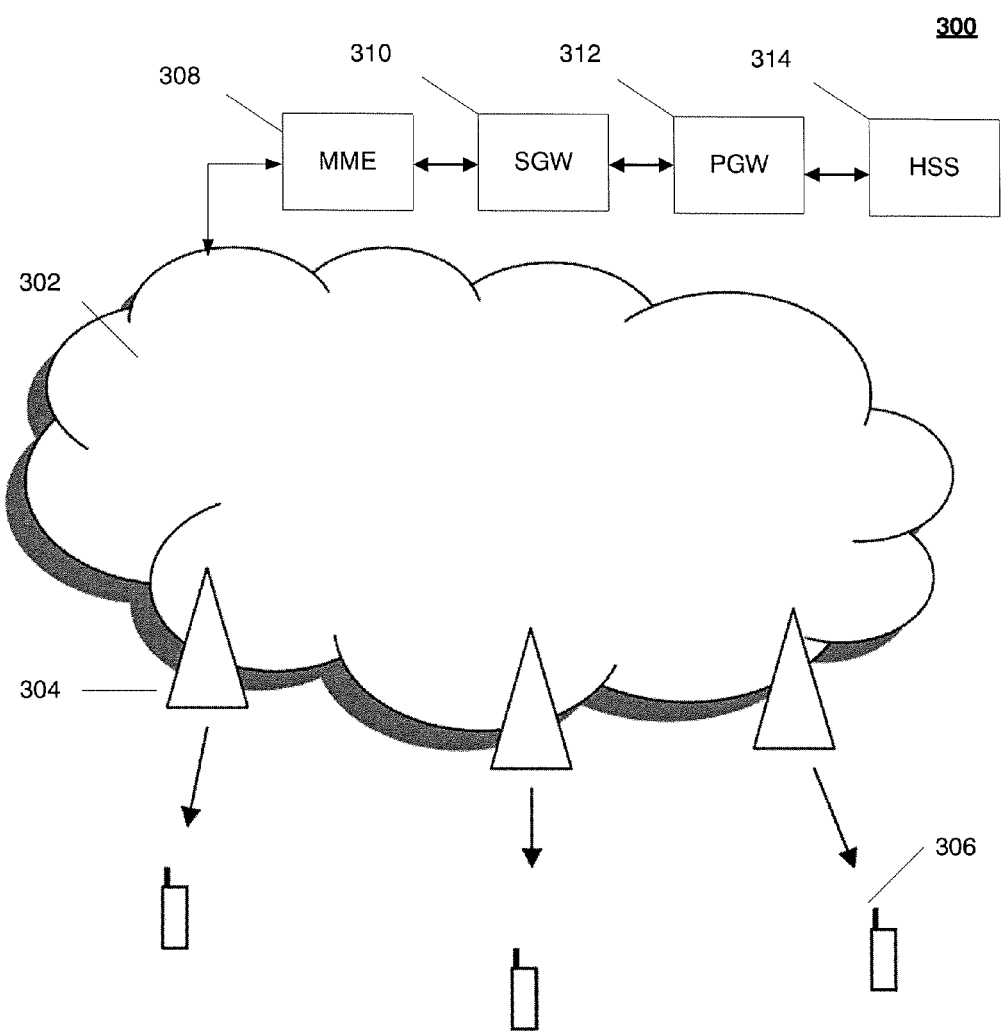
FIG. 3 is an exemplary illustration of a wireless communication topology.

Referring to FIG. 3, a wireless communication deployment 300 in accordance with exemplary embodiments includes an access node 304 serving a wireless communication device (WCD) 306. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 306 may be a legacy UE or dynamic TDD capable UE. Access node 304 may be, for example, a base station, an eNodeB, relay node, or gateway type device, and is capable of communicating with device 306, along with any additional elements suitable to support wireless communication between wireless communication devices or between a wireless communication device and another communication device, such as landline telephone. The access node 304 may be in communication with, for instance via a network 302, an MME 308. The MME 308 may be in communication with both the home subscriber server (HSS) 314 and SGW 310, which is in communication with PGW 312.

Figure 4:
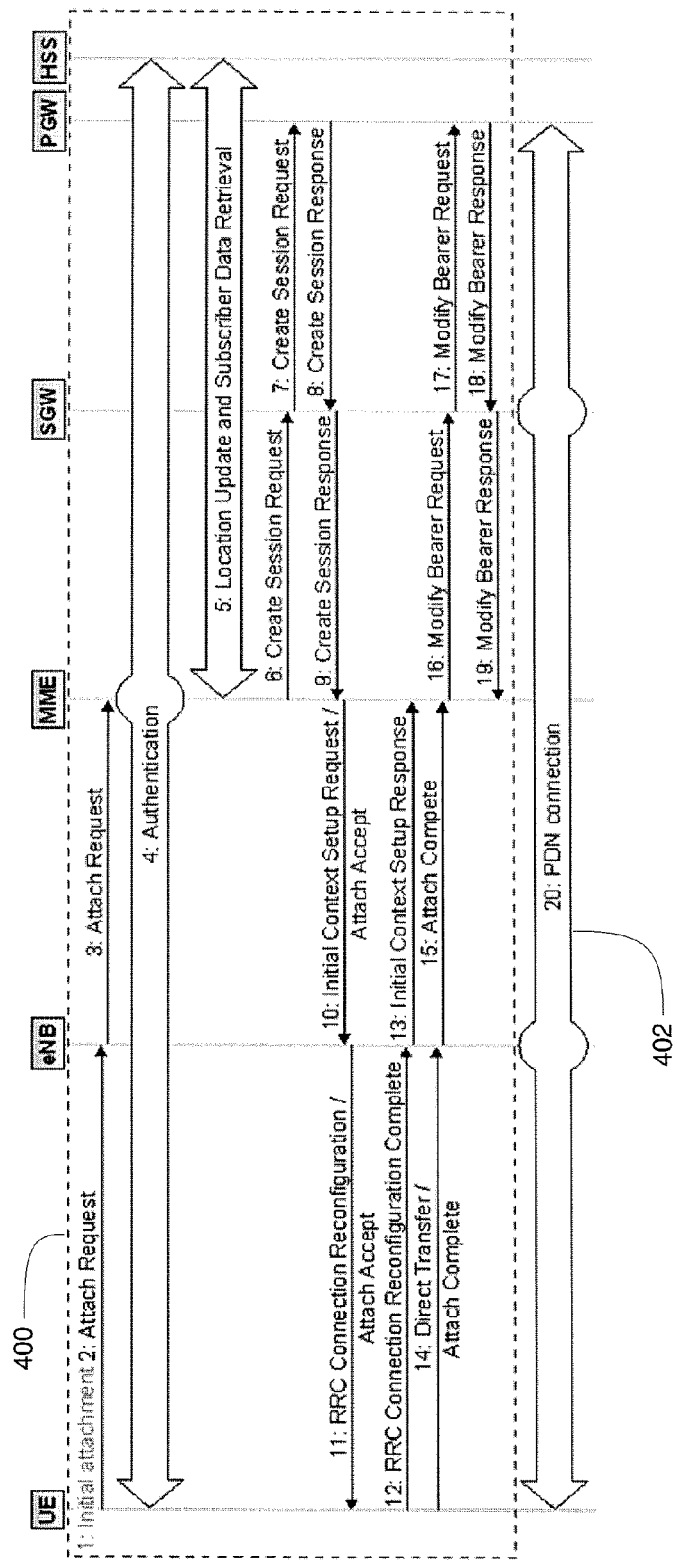
FIG. 4 is an exemplary sequence diagram illustrating initial attachment and setup of a first PDN connection over LTE.

FIG. 4 is a sequence diagram that illustrates an embodiment of steps that are performed when a UE connects to the EPC via a 3GPP access. Particularly, the steps illustrated in box 400 illustrate the steps performed to establish an initial PDN connection 402.

Figure 5:
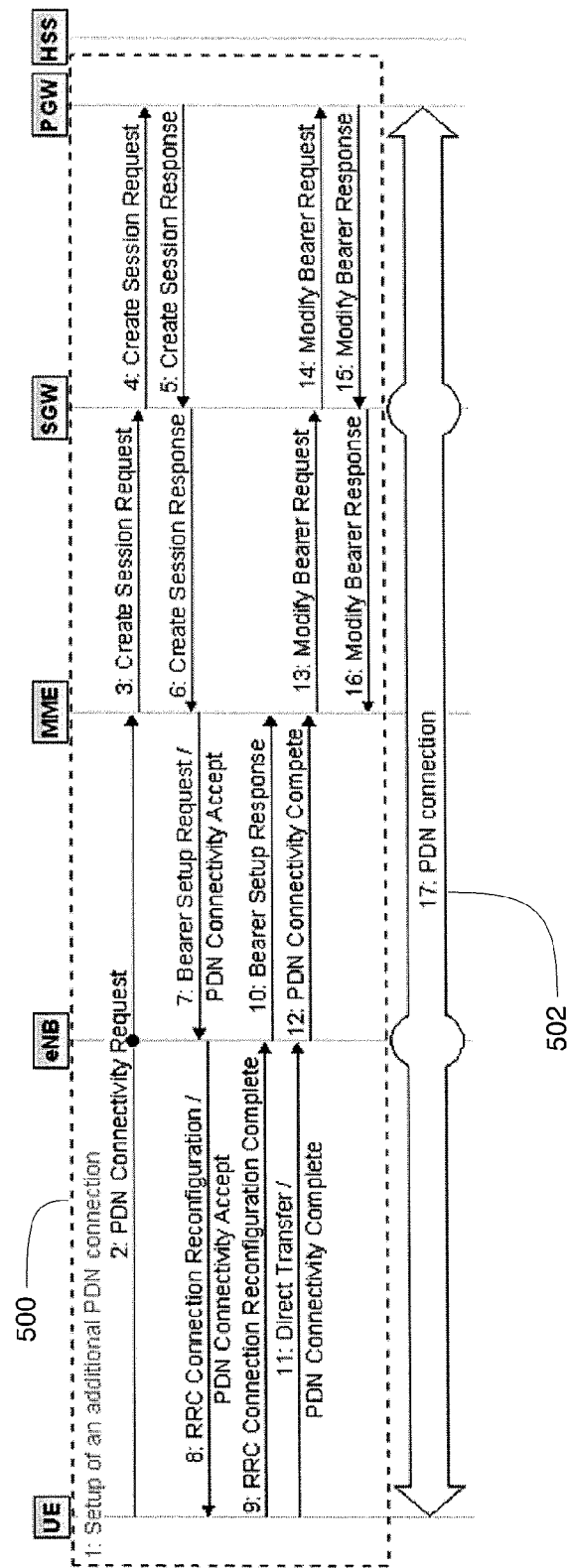
FIG. 5 is an exemplary sequence diagram illustrating setup of an additional PDN connection over LTE.

FIG. 5 is a sequence diagram illustrating steps for setting up an additional PDN connection over LTE, the procedure below is performed. Particularly, the steps illustrated in box 500 illustrate the steps performed to establish an additional PDN connection 502. In some embodiments, the resulting PDN connections illustrated in FIGS. 4 and 5 are logical IP tunnels between the UE and PGW, with three distinct tunnel segments: UE-eNB (the radio air link), eNB-SGW (an S1 GTP tunnel), SGW-PGW (an S5/S8 GTP tunnel).

According to some embodiments, an efficient dummy PDN connection is established by refraining from setting up the GTP tunnel segments between the SGW and PGW. By refraining from setting up this tunnel segment, no control signaling needs to be performed to the SGW and PGW, and no state (i.e. memory in the form of tunnel identifiers, counters, filters, buffers, etc.) need to be maintained in the SGW and PGW for the efficient dummy PDN connection.

Figure 6:
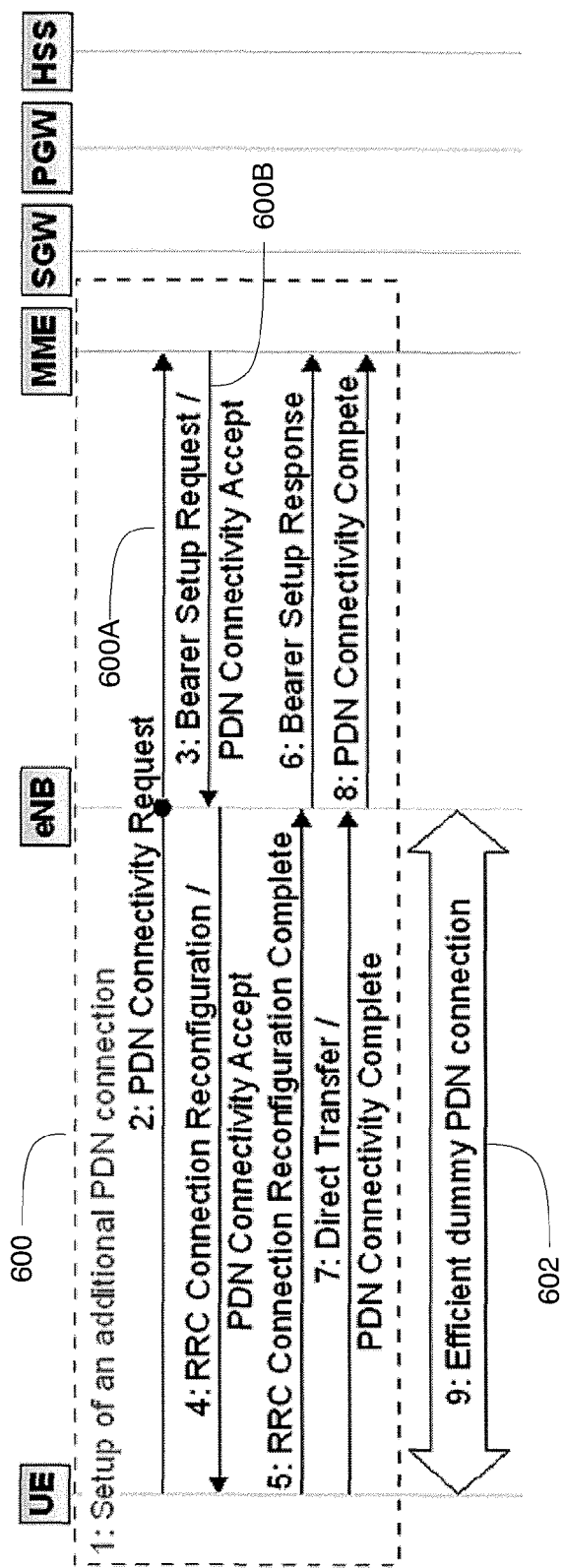
FIG. 6 is an exemplary sequence diagram illustrating setup of an efficient dummy PDN connection.

FIG. 6 is a sequence diagram that illustrates an embodiment for establishing an efficient dummy PDN connection. In particular, the steps performed in the box 600 establish the efficient dummy PDN connection 602. As illustrated in FIG.

6, the steps illustrated in box 600 do not involve the SGW, PGW, or HSS, but instead, primarily involve the MME, eNB, and UE. Furthermore, as illustrated in FIG. 6, the efficient dummy PDN connection 602 does not include the eNB-SGW and SGW-PGW tunnel segments.

According to some embodiments, in the "PDN Connectivity Request" step 600A, the UE may indicate that the PDN connection to be set up is an efficient dummy PDN connection by specifying an APN that is associated with the efficient dummy PDN connection. Particularly, the UE and MME know that a character string specified as the APN is associated with the efficient dummy PDN connection. The UE may be pre-configured with this efficient dummy APN string, or the UE may receive this string from a control node in the network. One example of the latter case is that the efficient dummy APN string is sent to the UE as part of the RAN traffic steering control signaling. In further embodiments, the UE can indicate that an efficient dummy PDN connection is requested in the request type information element or in another information element included in the "PDN Connectivity Request" step. In some embodiments, upon receiving the request to setup a PDN connection to the efficient dummy APN, the MME refrains from setting up the GTP tunnel. In other words, no Create Session Request is sent from the MME to the SGW.

In some embodiments, the MME sends a "PDN Connection Accept" to the UE via the UE-MME interface. In 3GPP specifications, this message translates to an "ACTIVATE DEFAULT EPS BEARER CONTEXT REQUEST" (see table 8.3.6.1 in 3GPP TS 24.301). The following parameters, set to a desired value in the "PDN Connection Accept" message in some embodiments, may be used in that message set:

Protocol discriminator—set to applicable value.
EPS Bearer ID—set to a value allocated by the MME according to normal procedure.
Procedure transaction identity—set to applicable value.
Activate default EPS bearer context request message identity—set to applicable value.
EPS QoS—May be set to any value valid. Maximum bit rates for uplink and downlink may be set to zero, to enforce that no traffic will be sent over the efficient dummy PDN connection.
APN—set to efficient dummy APN.
PDN Address—may be set to any value. The IPv4 address part may be set to 0.0.0.0. PDN type is part of PDN Address and may be set to any value.

According to some embodiments, the parameters for the efficient dummy PDN connection are set so that the UE does not schedule any uplink packets on the PDN connection. In exemplary one embodiment, the PDN address is set to 0.0.0.0 and PDN type to IPv4 (which is used to allow the UE to use DHCP for requesting an IP address). The network then does not provide a valid address. In another embodiment, the parameter APN Aggregate Maximum Bit Rate (APN-AMBR) is set to zero so that no traffic will be sent over the efficient dummy PDN connection. In another embodiment, a procedure "MODIFY EPS BEARER CONTEXT REQUEST" is initiated to add a Traffic Flow Template (TFT) which is set to a packet filter not matching any useful data traffic (e.g. port=9, the "discard protocol"), which causes the UE not to schedule any uplink packets on the efficient dummy PDN connection. In another embodiment, the UE is aware that the PDN connection is an efficient dummy PDN connection (e.g., from the APN or a separate new information element).

When the UE is aware that the PDN connection is an efficient dummy PDN connection, the UE locally ensures that no upstream traffic is sent over the PDN connection. For example, when the MME sets the TFT to an empty filter set, or a filter set to destinations that do not exist, the result is that the UE will not route traffic over the efficient dummy PDN connection. It is understood by one of ordinary skill in the art that each of these embodiments for setting the parameters may be implemented using any combination thereof.

According to some embodiments, the "PDN Connection Accept" message 600B is contained within a "Bearer Setup Request" that is sent from the MME to eNB. In 3GPP specifications, that message translates to an "E-RAB SETUP REQUEST" (see 3GPP TS 36.413). S1-TEID, a GTP tunnel endpoint identifier, is included as a mandatory parameter in the "PDN Connection Accept." S1-TEID may be set to any value as determined by the MME and known to one of ordinary skill in the art. However, when setting up the efficient dummy PDN connection, S1-TEID is not received from the SGW as when setting up a regular PDN Connection.

The MME may send an IP address (Transport Layer Address) belonging to itself as the S1 GTP endpoint identifier, which is needed if the eNB performs GTP path management procedures (e.g., echo request) for the received S1 transport layer address and TEID. Upon receiving the echo request from the eNB, the MME replies to the echo request (pretending to be the end-point of the GTP tunnel). That is, the echo request is received and replied to by the MME instead of the SGW. In another embodiment, the MME can provide address of another node which is able to reply to the GTP echo request. In another embodiment, the eNB could be configured to not send the GTP echo request.

In some embodiments, when the eNB receives the "Bearer Setup Request" message, the eNB acts according to the normal procedure for setting up a regular PDN connection. In this regard, the RRC reconfiguration is performed, the "ACTIVATE DEFAULT EPS BEARER CONTEXT REQUEST" and additional parameters are forwarded to the UE in an "RRC Connection Reconfiguration" message, and the air link is setup according to received QoS parameters. From the eNB perspective, the received S1-TEID is used for the GTP tunnel towards a transport layer address. Normally, this is the address of, and a TEID of, the SGW. However, the TEID provided from the MME to the eNB is an "efficient dummy" TEID selected by the MME and not by an SGW (as done during setup of other bearers). As a result, no downlink packets are received from that GTP tunnel as the SGW endpoint is not setup. Furthermore, no uplink packets are sent through that tunnel as the UE has received parameters for the EPS default bearer that causes the UE to not forward any packets on the bearer in the uplink direction.

When the UE receives the "RRC Connection Reconfiguration" it acts according to normal procedure. In some embodiments, when the MME receives the "PDN Connectivity Complete" it does not send a Modify Bearer Request to the SGW, and when the MME receives the "PDN Connectivity Complete," the MME does not send a Modify Bearer Request to the SGW.

As a result of the procedure implemented in the embodiments described above, an efficient dummy PDN connection is setup without the tunnel segments eNB-SGW and SGW-PGW. Accordingly, no resources are consumed in the SGW and PGW. Furthermore, the embodiments described above do not require changes to the eNB and the interfaces UE-eNB, eNB-MME and UE-MME. The MME may still need to keep a state related to the UE and the efficient dummy PDN connection. When the UE is in a connected mode, the eNB has context for the radio bearers associated with the efficient dummy PDN connection.

In the previously described embodiments, the efficient dummy PDN connection is setup as a separate PDN connection before a last "normal" PDN connection is moved away from the LTE network. According to some embodiments, the last "normal" PDN connection is transformed into an "efficient dummy" PDN connection when that last PDN connection is moved away from the LTE network. Transforming the last "normal" PDN connection to the efficient dummy PDN connection saves the signaling needed to setup an efficient dummy PDN connection as a completely new PDN connection.

Figure 7:
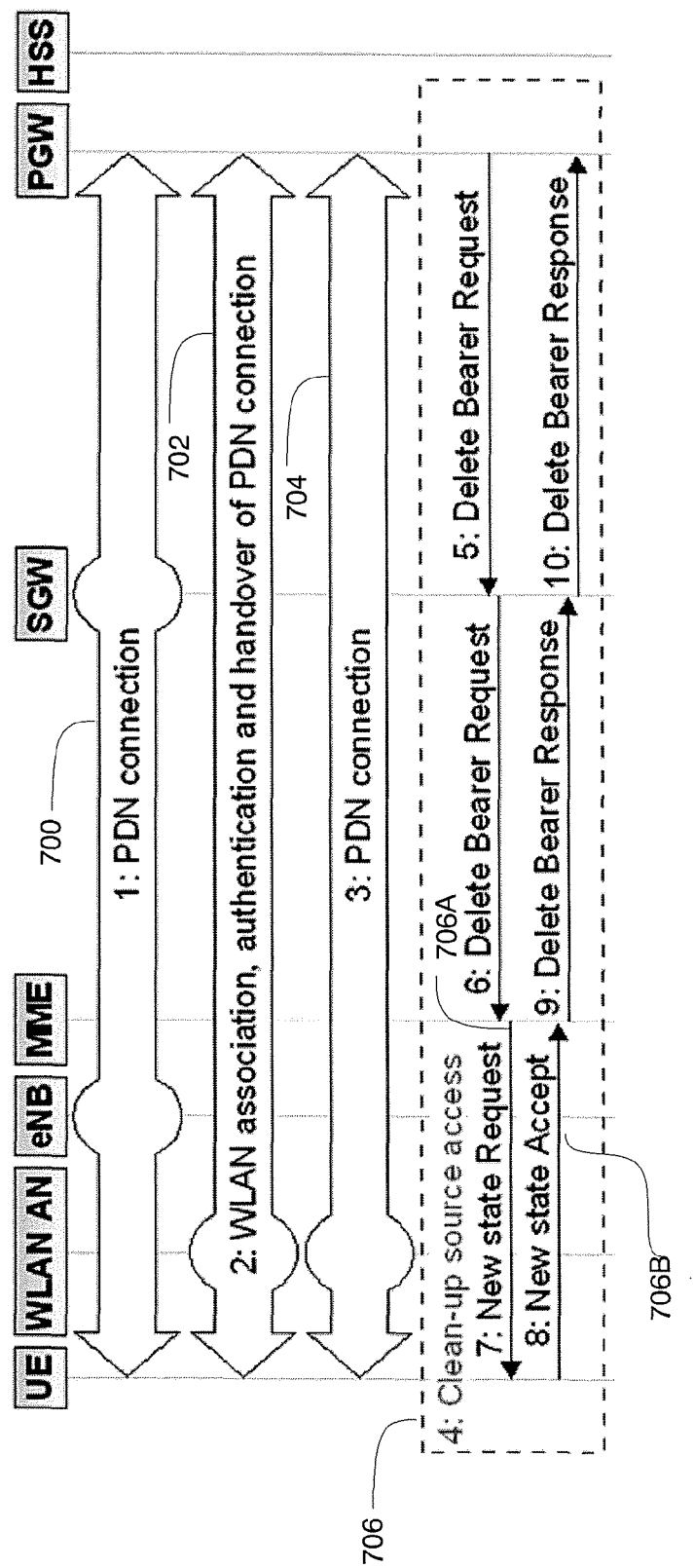
FIG. 7 is an exemplary sequence diagram illustrating converting a PDN connection from a normal state into an efficient dummy state.

FIG. 7 is a sequence diagram that illustrates steps for converting a normal PDN connection to an efficient PDN connection. In FIG. 7, in accordance with some embodiments, a pre-condition is that the UE has an ordinary PDN connection 700 to the LTE network (e.g., to the Internet APN). This PDN connection is handed over to a WLAN access network as illustrated in step 702. After this step, the PDN connection is routed via WLAN (step 704).

Figure 8:
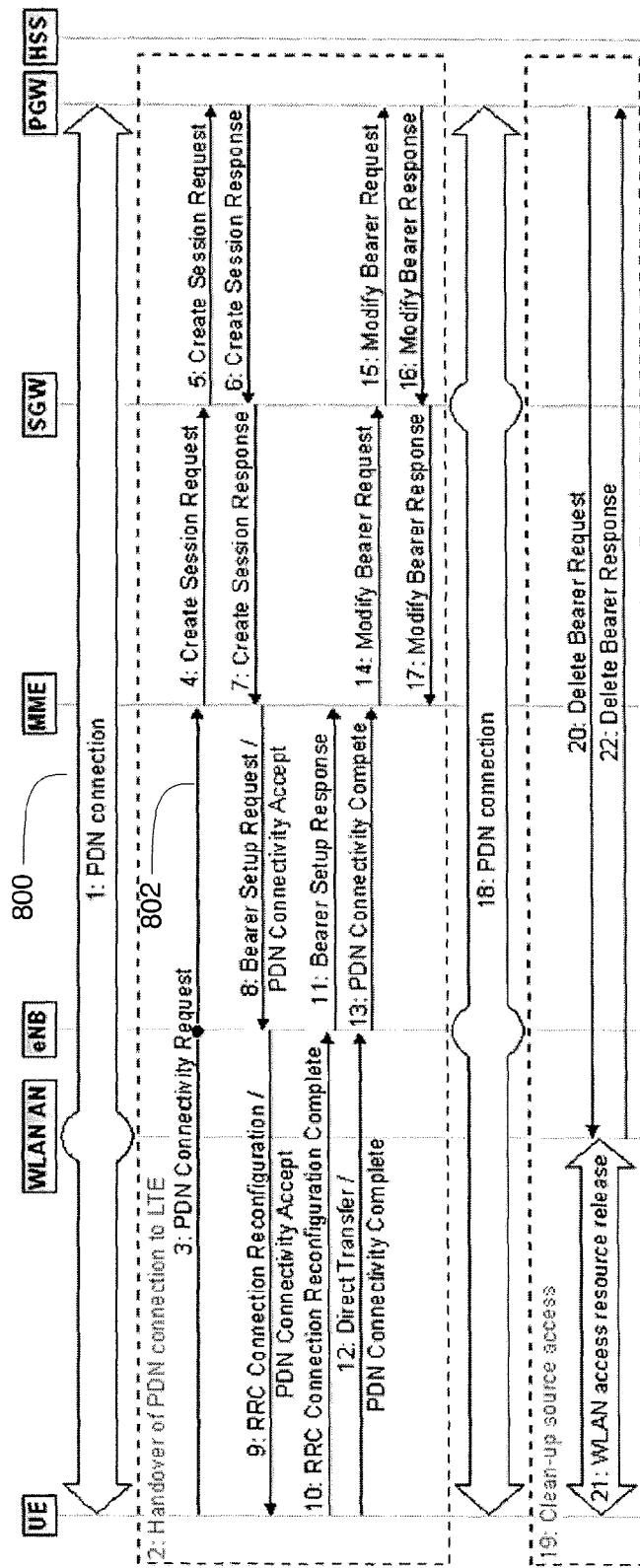
FIG. 8 is an exemplary sequence diagram illustrating converting a PDN connection from the efficient dummy state to the normal state.

The steps illustrated in box 706 illustrate a clean-up source access procedure after handover. The PGW may initiate the procedure to clean-up the source access after handover (see procedure "Bearer Deactivation" in 3GPP TS 23.401 section 5.4.4). That procedure is illustrated in FIG. 8, however, a couple of modifications are made to a conventional clean-up source access procedure.

Particularly, in the conventional clean-up source access procedure, a "Detach Request" may be sent to the UE when a PDN connection over LTE is being released. However, in accordance with some embodiments, instead of sending the ordinary Detach Request, the MME sends a message indicating that the state of the PDN connection is changed from a "normal" state to an "efficient dummy" state. Step 706A illustrates an example "New State Request" message that the MME sends to the UE.

In some embodiments, a new information element indicating the "efficient dummy" state is included in a message such as, for example, a Detach Request, a PDN disconnection message (as in 3GPP TS 23.401 section 5.10.3) or a "Session Management Request" (as in 3GPP TS 23.401 section 5.4.2). The latter message would translate to a "MODIFY EPS BEARER CONTEXT REQUEST" in more detailed 3GPP specifications.

In some embodiments, the MME may also inform the UE and eNodeB about new QoS parameters of the efficient dummy PDN connection. Once the last normal PDN connection is converted to the "efficient dummy" state, the UE will not send any uplink user plane packet over the PDN connection.

In some embodiments, when the MME receives the accept message (step 706B), the MME also moves the PDN connection to the "efficient dummy" state. In some embodiments, the MME sends the "Delete Bearer Response" to the SGW so that the resources in SGW and PGW are released.

According to some embodiments, the PDN connection converted to the "efficient dummy" state has the same properties as an efficient dummy PDN connection established as described in FIG. 6. In this regard, when the PDN connection is converted to the "efficient dummy" state, (1) there are no tunnel segments between eNB-SGW and SGW-PGW and QoS of radio resources in eNodeB is reduced, and (2) no resources are consumed in the SGW and PGW. When implementing the "efficient dummy state," however, changes are made to the UE-MME interface (i.e., new information element).

FIG. 8 illustrates a sequence diagram that illustrates an embodiment for converting a PDN connection in the "efficient dummy" state to a normal PDN connection. The procedure illustrated in FIG. 8 may take place when the PDN connection is handed over from the WLAN back to LTE. The "efficient dummy" state is then upgraded (i.e., reverted) to the normal state.

The procedure illustrated in FIG. 8 is similar to the procedure illustrated in FIG. 5. However, the difference between the procedure illustrated in FIG. 8 and FIG. 4 is the precondition that there is a PDN connection over WLAN (step 800). No complete initial attach (i.e., box 400 in FIG. 4) is needed since the UE is still known to the MME. The only difference with the procedure above and the normal handover procedure is the internal handling in UE and MME (e.g., the MME internally upgrades the efficient dummy PDN back to a normal PDN). Particularly, in step 802, the MME will see that a particular UE wants to come back to the LTE network. That UE is still known to the MME since the MME still keeps some state for the efficient dummy network connection of that UE (e.g., authentication keys are kept) Accordingly, in step 802, the MME sees that there is an efficient dummy network connection and upgrades that connection to a normal PDN connection. In some embodiments, the UE can initiate the modification from the efficient dummy state to the normal state by sending "Request Bearer Resource Modification Message" instead of sending "PDN connectivity request." The PDN connection illustrated at step 802 is a normal PDN connection over LTE that was converted from the "efficient dummy" state.

Figure 9:
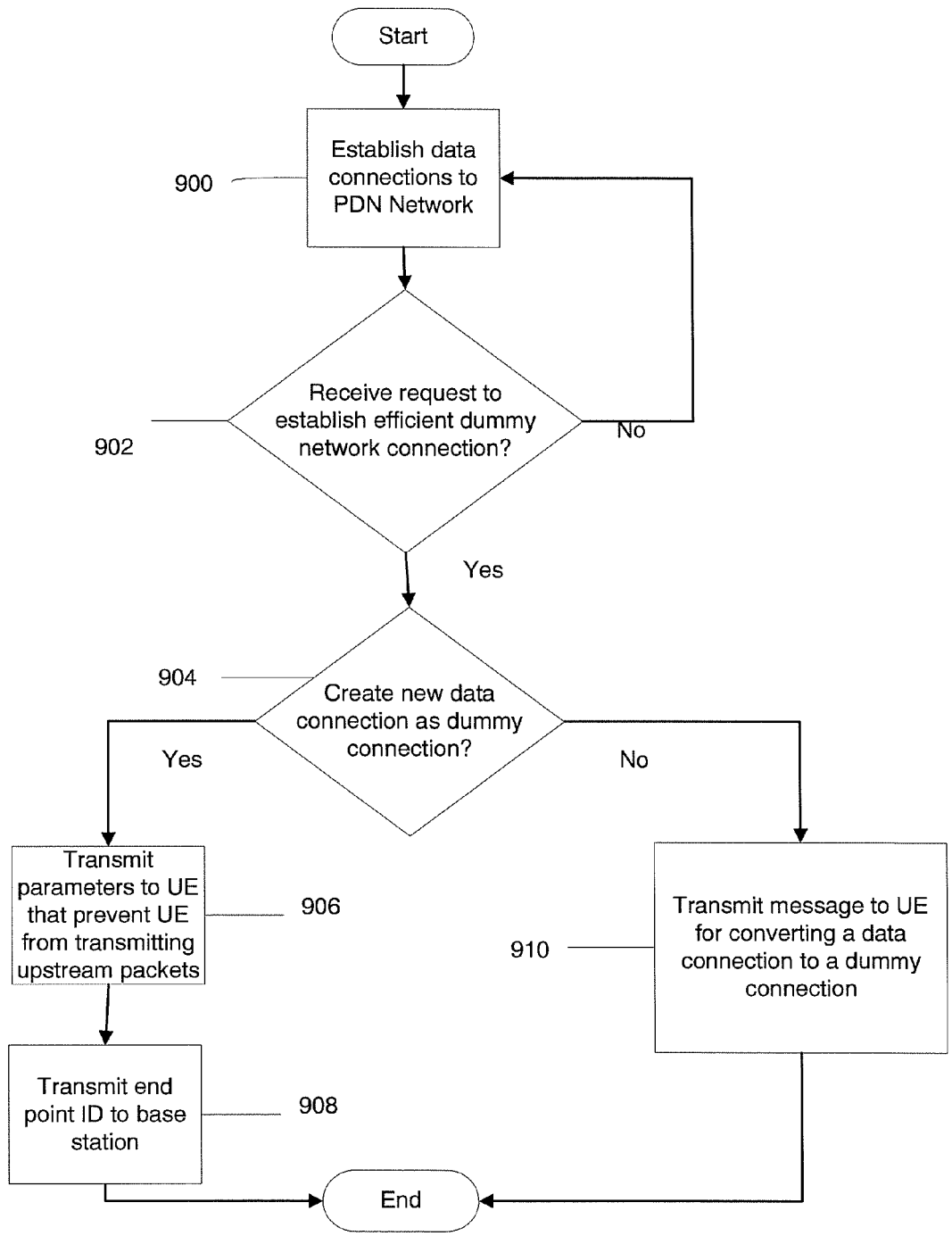
FIG. 9 is an exemplary flow chart illustrating a process for establishing an efficient dummy PDN connection.

FIG. 9 illustrates an embodiment of a process for establishing an efficient dummy PDN connection. In some embodiments, the process illustrated in FIG. 9 is performed by the MME. The process may generally start at step 900 where data connections are established on the PDN network over LTE. In step 902, it is determined whether a request to establish the efficient dummy network connection is received. If the request to establish the efficient dummy network connection is received, the process proceeds to step 904 to determine whether to create a new data connection as the efficient dummy PDN connection.

If it is determined that a new connection is added to create the efficient dummy PDN connection, the process proceeds to step 906 to transmit parameters to the UE, as described above, to prevent the UE from transmitting upstream packets. The process proceeds to step 908 to transmit an end point ID to a base station.

If a new data connection is not added to as the efficient dummy PDN connection, the process proceeds from step 904 to step 910 to transmit a message to the UE for converting a data connection to an efficient dummy state. The process ends after steps 908 and 910.

Figure 10:
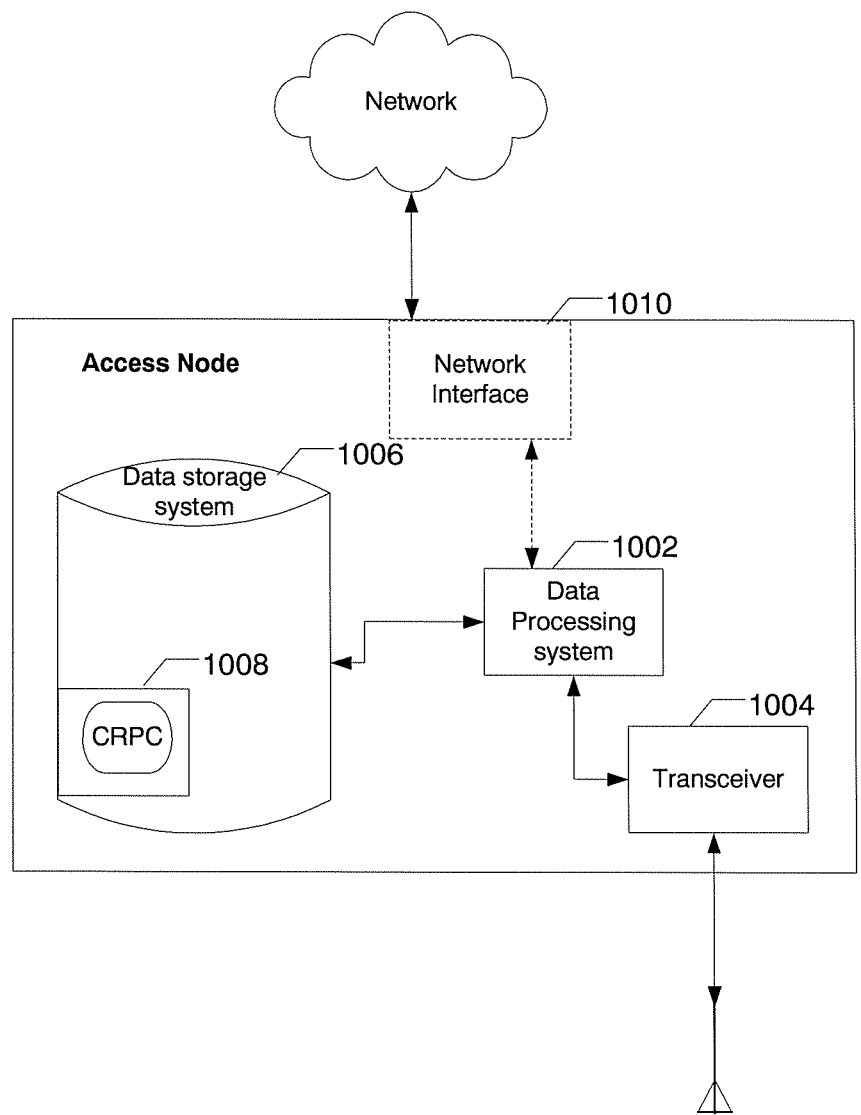
FIG. 10 illustrates an exemplary access node

FIG. 10 illustrates a block diagram of an exemplary access node, such as node 304 shown in FIG. 3. As shown in FIG. 10, the access node 304 may include: a data processing system 1002, which may include one or more microprocessors and/or one or more circuits, such as an application specific integrated circuit (ASIC), field-programmable gate arrays (FPGAs), and the like; a network interface 1010; a transceiver 1004, and a data storage system 1006, which may include one or more non-volatile storage devices and/or one or more volatile storage devices (e.g., random access memory (RAM)). According to some embodiments, the data processing system 1002 may comprise a control unit used for selection of transmission parameters.

In embodiments where data processing system 1002 includes a microprocessor, computer readable program code (CRPC) 1008 may be stored in a computer readable medium, such as, but not limited, to magnetic media (e.g., a hard disk), optical media (e.g., a DVD), memory devices (e.g., random access memory), and the like. In some embodiments, computer readable program code is executed by a processor. In other embodiments, the access node 304 is configured to perform steps described herein without the need for code. That is, for example, data processing system 1002 may consist merely of one or more ASICs. Hence, the features of the embodiments described herein may be implemented in hardware and/or software. For example, in particular embodiments, the functional components of the base station described above may be implemented by data processing system 1002 executing computer instructions, by data processing system 1002 operating independent of any computer instructions, or by any suitable combination of hardware and/or software.

Figure 11:
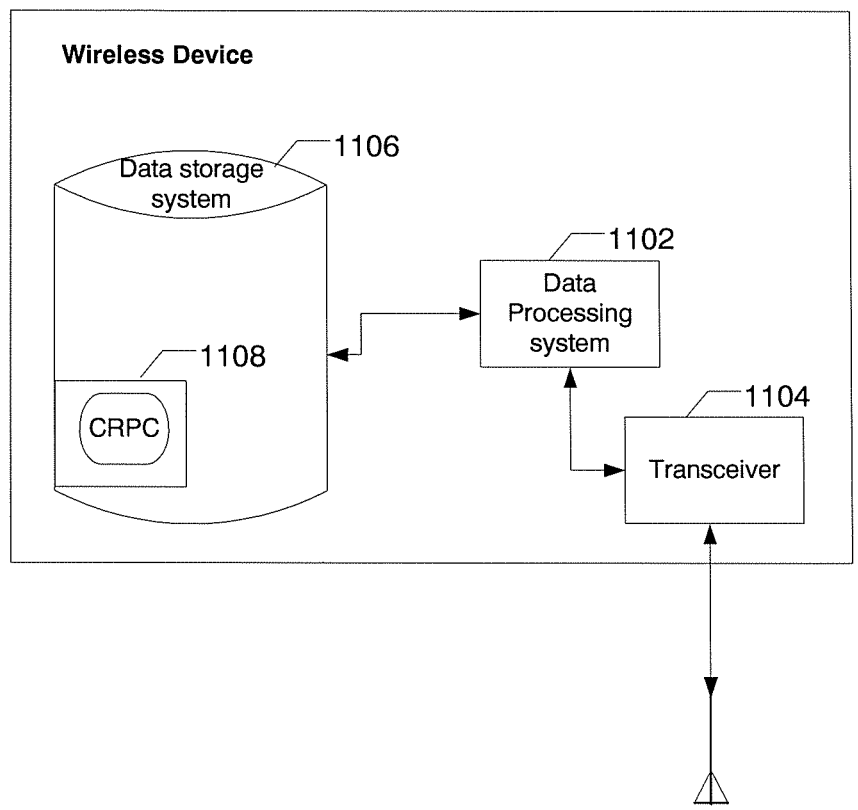
FIG. 11 illustrates an exemplary wireless device

FIG. 11 illustrates a block diagram of an exemplary wireless device, such as device 306 shown in FIG. 3. As shown in FIG. 11, the device 306 may include: a data processing system 1102, which may include one or more microprocessors and/or one or more circuits, such as an application specific integrated circuit (ASIC), field-programmable gate arrays (FPGAs), and the like; a transceiver 1104, and a data storage system 1106, which may include one or more non-volatile storage devices and/or one or more volatile storage devices (e.g., random access memory (RAM)). According to some embodiments, the data processing system 1102 may comprise a control unit used for selection of transmission parameters.

In embodiments, where data processing system 1102 includes a microprocessor, computer readable program code (CRPC) 1108 may be stored in a computer readable medium, such as, but not limited, to magnetic media (e.g., a hard disk), optical media (e.g., a DVD), memory devices (e.g., random access memory), and the like. In some embodiments, computer readable program code is executed by a processor. In other embodiments, the device 306 is configured to perform steps described herein without the need for code. That is, for example, data processing system 1102 may consist merely of one or more ASICs. Hence, the features of the embodiments described herein may be implemented in hardware and/or software. For example, in particular embodiments, the functional components of the base station described above may be implemented by data processing system 1102 executing computer instructions, by data processing system 1102 operating independent of any computer instructions, or by any suitable combination of hardware and/or software.

Figure 12:
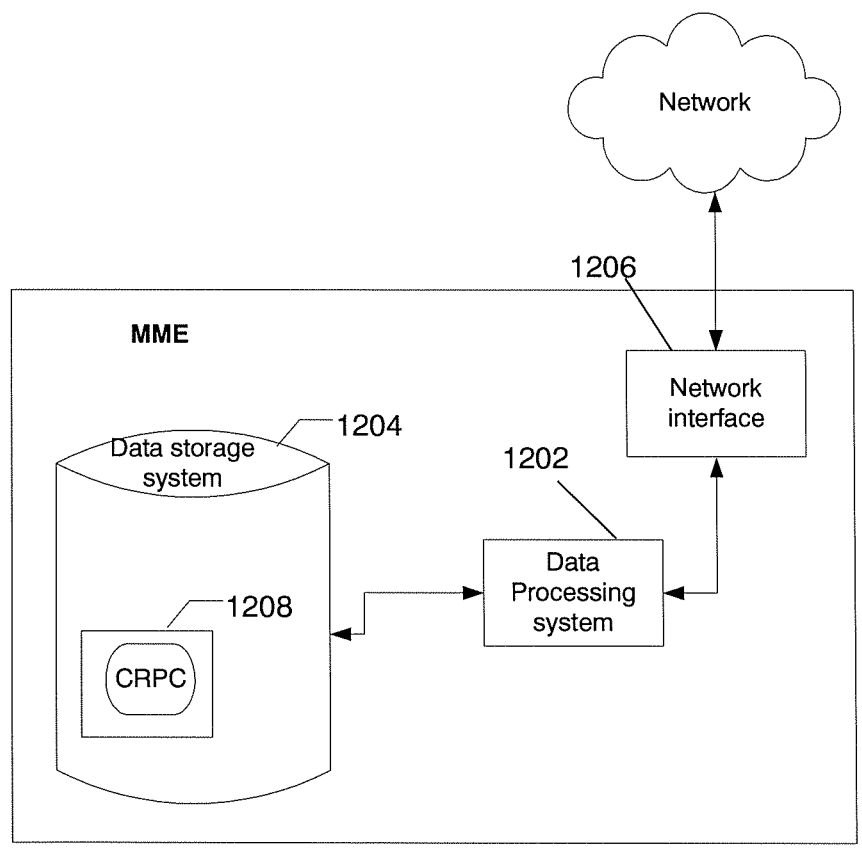
FIG. 12 illustrates an exemplary node for a gateway and mobility management entity (MME).

FIG. 12 illustrates a block diagram of an MME, such as MME 308 shown in FIG. 3. As shown in FIG. 12, the MME 308 may include: a data processing system 1202, which may include one or more microprocessors and/or one or more circuits, such as an application specific integrated circuit (ASIC), field-programmable gate arrays (FPGAs), and the like; a network interface 1206, and a data storage system 1204, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above (e.g., steps described above with reference to the sequence diagrams shown in FIGS. 6-8 and the flow chart shown in FIG. 9). In other embodiments, the MME 308 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

The advantages of the embodiments described herein include, but are not limited to: (1) the UE stays connected to LTE; (2) RAN entities can control UE usage of WLAN; (3) SMSs or emergency alerts can be delivered to the UE; (4) There is no GTP tunnel between eNodeB and P-GW(s) for the UE; (5) No user plane is sent via LTE; and (6) the PGW and SGW resources are not unnecessary reserved.

Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

3GPP Third Generation Partnership Project
ANDSF Access Network Discovery And Selection Function
AP Access Point
APN Access Point Name
eNB eNodeB
EPC Evolved Packet Core
EPS Evolved Packet System
ETWS Earthquake and Tsunami Warning System
E-UTRAN Evolved Universal Terrestrial Radio Access Network
GTP GPRS Tunneling Protocol
GW Gateway
LTE Long Term Evolution
MME Mobile Management Entity
PDN Packet Data Network
PWS Public Warning System
RAN Radio Access Network
RNC Radio Network Controller
UE User Equipment
WLAN Wireless Local Area Network

The invention claimed is:
1. A method, implemented by a network node, for establishing an efficient dummy network connection between a mobile device and a first network, the method comprising:
 establishing at least one data connection between the mobile device and the first network;

receiving a request to establish the efficient dummy network connection; and establishing the efficient dummy network connection after receiving the request, wherein the efficient dummy network connection that is established uses a minimum number of network resources, said minimum number of network resources being less than the number of network resources used in the at least one data connection, wherein one of the network resources not used by the efficient dummy network connections is control signaling between a serving gateway (SGW) and a packet data network (PDN) gateway (PGW) in the first network, and wherein the step of establishing the efficient dummy network further includes:

setting one or more parameters that prevents the mobile device from transmitting upstream data packets on the efficient dummy network connection, and transmitting the one or more parameters to the mobile device.

2. The method according to claim 1, wherein one of the network resources not used in establishing the efficient dummy network connection is tunnel segments between a serving gateway (SGW) and a packet data network (PDN) gateway (PGW) in the first network.

3. The method according to claim 1, wherein the at least one data connection and efficient dummy network connection are packet data network (PDN) connections.

4. The method according to claim 1, wherein one of the network resources not used in the efficient dummy network connection further includes control signaling between the network node and the SGW.

5. The method according to claim 1, wherein no IP address is provided to the mobile device.

6. The method according to claim 1, wherein the one or more parameters includes an Access Point Name (APN) that is associated with the efficient dummy network connection.

7. The method according to claim 1, wherein the one or more parameters includes a traffic flow template (TFT) that is set to a packet filter that is not associated with data traffic.

8. The method according to claim 1, wherein the one or more parameters includes an access point name (APN) aggregate maximum bit rate (AMBR) set to zero.

9. The method according to claim 1, wherein the step of establishing the efficient dummy network connection further includes:

transmitting, to a base station in communication with the mobile device, a data connection endpoint identifier associated with the efficient dummy network connection, and responding to one or more messages received from the base station in association with the data connection endpoint identifier.

10. The method according to claim 1, wherein the step of establishing the efficient dummy network connection further includes converting the at least one data connection to the efficient dummy network connection.

11. The method according to claim 10, wherein the step of converting the at least one data connection to the efficient dummy network connection further includes transmitting, to the mobile device, a message pertaining to a connection state of the at least one data connection, the message including an information element that indicates that the at least one data connection is converted to the efficient dummy network connection.

12. The method of claim 1, wherein the first network is a Third Generation Partnership Project (3GPP) network and the second network is a Wireless Local Area Network (WLAN).

13. The method of claim 1, wherein the network node is a mobility management entity (MME).

14. A network node for establishing an efficient dummy network connection between a mobile device and a first network, the network node comprising:

a processor; and a memory coupled to the processor, wherein the processor is configured to:

establish at least one data connection between the mobile device and the first network, receive a request to establish the efficient dummy network connection, and establish the efficient dummy network connection after reception of the request, wherein the efficient dummy network connection that is established uses a minimum number of network resources, said minimum number of network resources being less than the number of network resources used in the at least one data connection, wherein the one of the network resources not used by the efficient dummy network connection is control signaling between a serving gateway (SGW) and a packet data network (PDN) gateway (PGW) in the first network, and wherein to establish the efficient dummy network connection, the processor is further configured to:

set one or more parameters that prevents the mobile device from transmitting upstream data packets on the efficient dummy network connection, and transmit the one or more parameters to the mobile device.

15. The network node according to claim 14, wherein one of the network resources not used in establishing the efficient dummy network connection is tunnel segments between a serving gateway (SGW) and a packet data network (PDN) gateway (PGW) in the first network.

16. The network node according to claim 14, wherein the at least one data connection and the efficient dummy network connection are packet data network (PDN) connections.

17. The network node according to claim 14, wherein the at least one network resource not used in the efficient dummy network connection further includes control signaling between the network node and the SGW.

18. The network node according to claim 14, wherein no IP address is provided to the mobile device.

19. The network node according to claim 14, wherein the one or more parameters includes an Access Point Name (APN) that is associated with the efficient dummy network connection.

20. The network node according to claim 14, wherein the one or more parameters includes a traffic flow template (TFT) that is set to a packet filter that is not associated with data traffic.

21. The network node according to claim 14, wherein the one or more parameters includes an access point name (APN) aggregate maximum bit rate (AMBR) set to zero.

22. The network node according to claim 14, wherein, to establish the efficient dummy network connection, the processor is further configured to:

transmit, to a base station in communication with the mobile device, a data connection endpoint identifier associated with the efficient dummy network connection, and respond to one or more messages received from the base station in association with the data connection endpoint identifier.

23. The network node according to claim 14, wherein, to establish the efficient dummy network connection, the processor is further configured to convert the at least one data connection to the efficient dummy network connection.

24. The network node according to claim 23, wherein, to convert the at least one data connection to the efficient dummy network connection, the processor is further configured to transmit, to the mobile device, a message pertaining to a connection state of the at least one data connection, the message including an information element that indicates that the at least one data connection is converted to the efficient dummy network connection.

25. The network node of claim 14, wherein the first network is a Third Generation Partnership Project (3GPP) network and the second network is a Wireless Local Area Network (WLAN).

26. The network node of claim 14, wherein the network node is a mobility management entity (MME).

* * * * *